Jan. 5, 1943.　　　　L. M. PERSONS　　　2,307,294
COFFEE ROASTER CONTROL
Filed July 21, 1937

INVENTOR.
LAWRENCE M. PERSONS
BY Lawrence C. Kingland
ATTORNEY.

Patented Jan. 5, 1943

2,307,294

UNITED STATES PATENT OFFICE 2,307,294

COFFEE ROASTER CONTROL

Lawrence M. Persons, St. Louis County, Mo., assignor to Automatic Control Corporation, St. Louis, Mo., a corporation of Delaware Application July 21, 1937, Serial No. 154,764

10 Claims. (Cl. 34—45)

The present invention relates to a coffee roaster, and in particular to a control for the same.

In coffee roasters the coffee is usually introduced into a hopper and from it into the roasting chamber. In the latter, it is necessary that the temperature and duration of the roasting operation be definitely limited in order to avoid burning the coffee. The coffee subsequently goes to a cooling chamber wherein air is drawn across it to prevent spontaneous combustion and to reduce the temperature.

Coffee roasters ordinarily are cyclic in operation with successive roastings overlapping. Thus, at the time one batch is in the roasting chamber, the previous one may be in the cooling chamber. It is necessary to prevent mixing of the two batches.

The present invention provides a thermostatic control operating on the heating means to limit the temperature of the coffee in the roasting chamber. It likewise provides automatically operable means for discharging the coffee from the roasting chamber into the cooling chamber. Supplemental means are provided to afford a warning shortly before discharge of the coffee from the roasting chamber into the cooling chamber to insure that the previous batch will be removed from the cooling chamber prior to introduction of the subsequent one thereinto.

It is an object of the present invention to provide thermostatic means controlling a coffee roaster to attain each of the results above set forth.

It is an additional object of the invention to provide a control for the main heater element operated by movement of the coffee supply hopper.

In this connection, it is an object to provide a switch closing the circuit to the main heater element when the hopper is moved to operating position but which switch is not opened when the hopper is subsequently removed to inoperative position.

It is a further object of the invention to provide a mechanically actuated mechanism to initiate the roasting operation, that is independent of failures of current and of changes of the hopper positions.

In the drawing:

Fig. 4 is a wiring diagram of the control; and

The particular coffee roaster is not a part of this invention other than in combination with the control to be described. The thermostat switches to be described may be of the general type disclosed in a copending application Serial No. 79,736, filed May 14, 1936, by the present inventor. The details of the hopper control switch, taken by themselves and apart from any combination, are disclosed in application Serial No. 154,765, filed July 24, 1937, by the present inventor and resulting in Patent 2,168,580.

Figure 1:
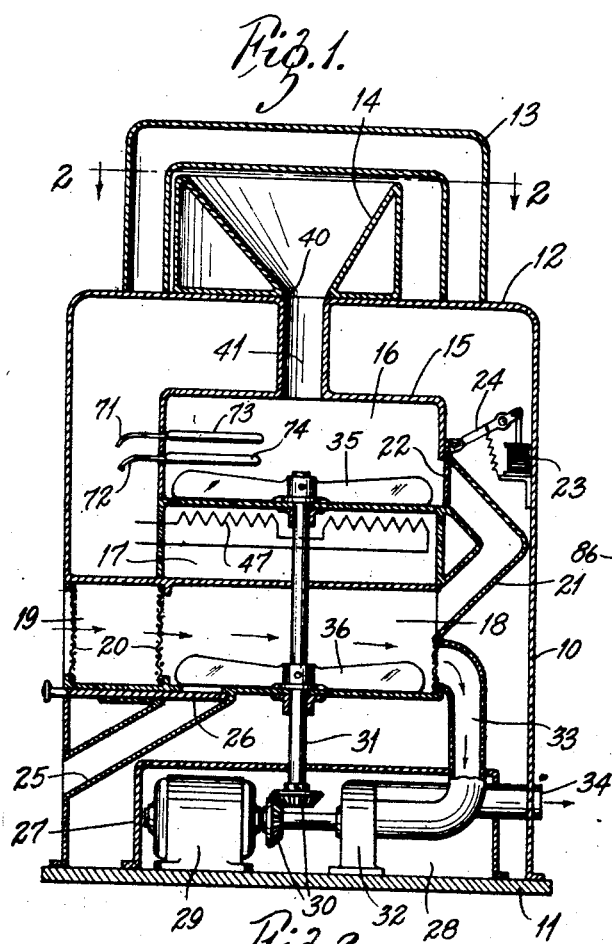
Fig. 1 is a sectional view of a coffee roasting device of a type upon which the present invention may be used.
Figure 2:
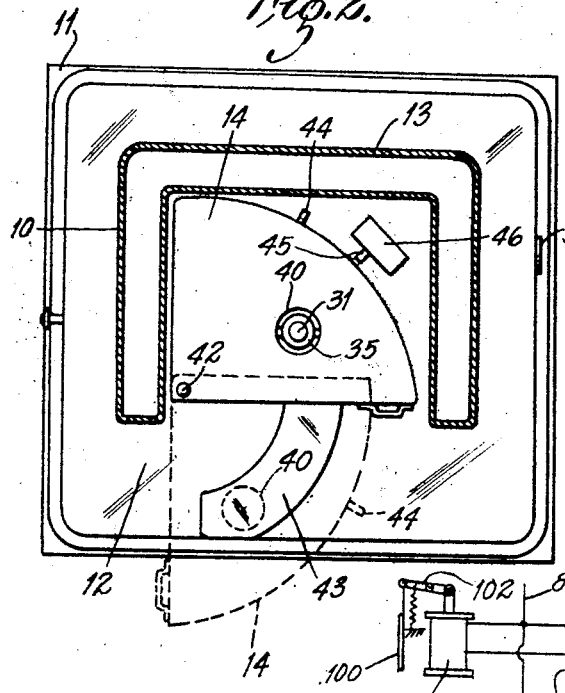
Fig. 2 is a horizontal section of the coffee roaster taken on line 2—2 of Fig. 1.

Referring to Fig. 1, the coffee roaster may have an outer casing 10 resting on a base 11. This casing has a top surface 12 upon which is mounted a hopper cover 13 having a hopper 14 therein.

Within the casing 10 there is an inner casing 15 providing a coffee roasting chamber 16. Immediately below the roasting chamber there is a heater element enclosure 17 and below the latter a cooling chamber 18. The cooling chamber opens at 19 to the outside and is provided with screens 20 through which air may be drawn, as will be described. An inclined chute 21 connects the roasting chamber 16 with the cooling chamber 18, there being a gate 22 closing off the chute 21. This gate is adapted to be opened by a magnet 23 through means of a linkage 24. A discharge chute 25 leads from the bottom of the cooling chamber 18 and is controlled by a manually operated gate 26.

A motor chamber housing 27 is mounted on the base 11 to provide a motor chamber 28. The motor 29 is mounted therein and through gears 30 drives a vertical shaft 31. The motor 29 also operates a blower 32 having an intake 33 opening into the cooling chamber 18 and an exhaust 34 discharging into the atmosphere.

The shaft 31 extends into both the chambers 16 and 18. In the chamber 16 an agitator 35 is mounted on the shaft 31. Within the cooling chamber 18 a similar agitator 36 is mounted on the shaft 31. These two agitators consist of radiating arms that move in the coffee and keep the same in motion in the two chambers. They also assist in discharging the coffee through the chutes 21 and 25.

The hopper 14 has an outlet opening 40 that, when the hopper is closed, is located directly over a chute 41 that leads to the roasting chamber 16. The hopper is pivoted at 42 to swing outwardly 90°. In so doing, the opening 40 is carried over a plate 43 upon which it rests so that the coffee is maintained within the hopper until the latter is in closed position with the opening 40 over the chute 41. The hopper has on it a pin 44 that swings in an arc when the hopper is moved and strikes another pin 45 on a control switch 46. This switch controls a circuit to the main heater 47 located beneath the roasting chamber 16.

Figure 3:
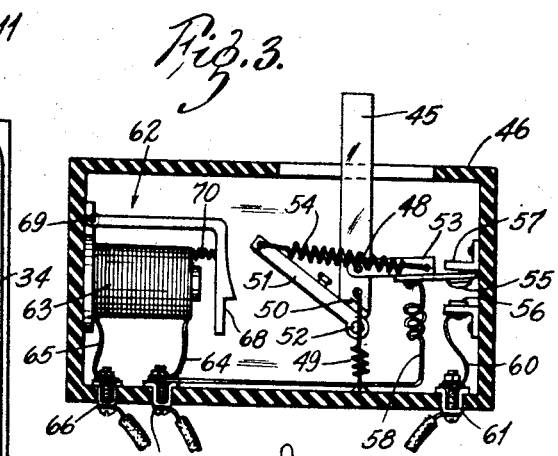
Fig. 3 is a vertical section through the hopper switch.

The switch 46 is enclosed in a housing, as shown in Fig. 3. The lever 45 swings in either direction and is pivoted at 48. A centering spring 49 is attached to the housing of the switch and also to the inner end of the lever and normally maintains the lever in the position shown in Fig. 3. The lever has on its end an upstanding lug 50.

A second lever 51 is pivoted at 52 to the switch housing and its inner end adjacent the pivot extends into contact with the lug 50 on the lever 45. A switch arm 53 is pivoted on the pin 48 and is made of insulating material. A spring 54 is attached between the lever 51 and the switch arm 53. The outer portion of the switch arm 53 is of conducting material and has on it a contact point 55. A fixed contact 56 is secured to the wall of the housing and limits the downward movement of the switch arm. The upward movement of the arm is controlled by a fixed stop 57 attached to the housing.

A flexible connection 58 leads from the conducting part of the switch arm to a terminal 59. The fixed contact 56 is connected by a lead 60 to a terminal 61.

An electro-magnetic latch release mechanism generally indicated at 62 is mounted on the other end of the switch housing. It includes a magnet 63, one end of the coil 64 of which is connected to the terminal 59. The other end of the coil is connected by a lead 65 to the terminal 66. A latch 68 is pivoted at 69 to the magnet and is normally urged to an outer latching position by a spring 70. The latch 68 receives the lever 51 when the same is urged downwardly which takes place when the pin 44 on the hopper 14 is moved inwardly upon closing of the hopper.

The control circuit includes two thermostatic switches 71 and 72 of the type shown in copending application Serial No. 79,736 previously mentioned. The switch 71 includes a bulb 73 and the switch 72 includes a bulb 74. These two bulbs are designed to be mounted in the roasting chamber in a manner such as shown in Fig. 1. They may be located at any suitable point within the chamber but should project into the coffee as it is being roasted so as to be operated by the coffee temperature. As shown by Fig. 4, the switch 71 is designed to operate at 250° F. and the switch 72 at 400° F., although these values are merely representative.

The power line for the mechanism is shown in Fig. 4 at 80 and 81. A manual switch 82 is provided for cutting the device entirely off. The motor 29 is connected directly across the power lines back of the manual switch 82. The main heater 47 is connected at one end to the power line 81 and at the other end to the terminal 59 on the switch 46. The terminal 61 is connected by a line 83 to the power line 80. From the other terminal 66 of the switch 46, a lead 84 extends to the switch 72. When this switch is closed, the line 84 is connected to the power line 81.

The gate magnet 23 is connected at one side directly to the power line 80, at the other side to a lead 85 extending to the switch 72, so that, when the latter is closed, the lead 85 is also connected to the power line 81.

A bell 86 has one lead 87 connected directly to the power line 80. The other lead 88 of the bell leads to a fixed terminal 89 of a thermal relay generally indicated at 90. This relay has a bimetal 91 supporting a movable contact 92 adapted to close with the fixed contact 89. This bimetal 91 is also connected to a lead 93 extending to the thermal switch 71. From the other side of this thermal switch extends a lead 94 to the power line 81. Also connected between the power line 80 and the lead 93 is a heater 95 for operating the relay 90.

The operation of the device is as follows:

A certain quantity of coffee is introduced into the hopper 14 and the manual switch 82 is turned on. With the closing of the switch 82, the motor 29 is energized and starts operation of the blower 32 as well as rotation of the two agitators 35 and 36.

The hopper with the coffee therein is then moved to closed position, discharging its coffee through the passage 41 into the heating chamber 16. In so doing, it shifts the lever 45 of the switch 46 in a clockwise direction in both views, causing the lug 50 on this lever 45 to shift the trip lever 51 in a counterclockwise direction in Fig. 3 until it engages beneath the latch 68. When the pin 45 is freed by passage of the pin 44 on the hopper, it is returned to starting position by the spring 49; and after engagement of the lever 51 under the latch further movement of the pin 45 has no effect on this switch.

When the pin 51 moves down, the spring 54 is moved over-center with respect to the switch lever 53, whereupon the switch is shifted to closed position with a snap action. However, in this operation the spring 54 remains ahead of center with respect to the lever 51. The spring, therefore, constantly urges this lever 51 upwardly.

With the closing of the switch 46, the main heater 47 is connected in circuit as follows: power line 80, lead 83, terminal 61, lead 60, contact 56, switch lever 53, lead 58, terminal 59, heater 47, and power line 81.

At this time, the coffee is now in the roasting chamber 16 and is agitated therein by the agitator 35. It is also being heated by the heater 47. When it reaches an intermediate temperature, such as 250° F., the thermostatic switch 71 is closed for a purpose better described hereinafter. As the coffee continues to heat, it will reach a higher temperature, such as 400° F., to operate the second thermostatic switch 72. Closing of this switch operates the following circuits: the trip magnet 63 is energized through power line 80, lead 83, terminal 61 of the switch 46, lead 60, contact 56, switch blade 54, lead 58, terminal 59, lead 64, magnet 63, lead 65, terminal 66, lead 84, and switch 72 to power line 81. At the same time, by closing of the switch 72, the gate magnet 23 is energized from line 80, magnet 23, lead 85, switch 72, and line 81. Upon energization of the magnet 23, the linkage 24 is shifted to lift the gate 22.

The energization of the magnet 63 draws the latch 68 away from the lever 51 which is drawn upwardly by the spring 54 until it strikes the lug 50 on the pin 45 (or other suitable stop), whereupon it again becomes subject to the movement of the lever 45 when the same is shifted by the hopper pin 44. With the shifting of the lever 51 upward, the spring 48 is returned back over-center with respect to the switch lever 53, so that the same is opened with a snap action. Thus, the main heater is cut out of circuit and rendered substantially ineffective, and the release magnet 63 deenergized. The gate 22 being open, the agitator 35 forces all the coffee thus roasted into the chute 21, whereupon it falls into the cooling chamber 18. In this chamber, it is agitated by the agitator 36 and is cooled by the blast of air produced by the blower 32. With the removal of the coffee from the roasting chamber 16 and the cutting off of the heater 47, the thermostats 73 and 74 cool down and their switches then open.

With the opening of the switch 72, the gate magnet is deenergized so that the gate 22 closes. A new batch of coffee is then introduced into the roasting chamber 16 by closing of the hopper. The hopper, in so closing and by means of the pin 44, again latches the switch 46 closed so that the main heater is put in circuit. The roasting of the new batch thus begins.

When this batch reaches 250° F., or thereabout, the thermostatic switch 71 is closed. This first energizes the relay heater 95 as follows: line 80, heater 95, lead 93, switch 71, lead 94, and power line 81. The heater 95 acts on the bimetal 91 which responds by closing the contact 92 against the contact 89. When this occurs, the bell 86 is put in circuit as follows: line 80, lead 87, bell 86, lead 88, contact 89, contact 92, bimetal 91, lead 93, switch 71, lead 94, and line 81.

The bell serves as a warning that the second batch of coffee is approaching its roasted temperature and that it will shortly be discharged automatically into the cooling chamber 18. The operator, therefore, is warned that he should manually open the gate 26 and permit the agitator 36 to force the first batch of coffee through the chute 25.

Figure 5:
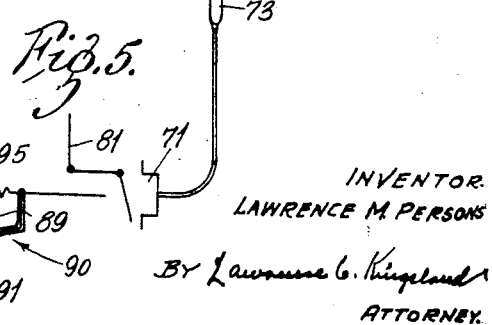
Fig. 5 is a wiring diagram of a modification.

Of course, it is quite evident that another gate for discharge of the coffee from the cooling chamber 18 could be employed instead of the bell 86. Such a gate is shown in Fig. 5 at 100. It is operated by a magnet 101 through a linkage 102. The magnet 101 is energized by the thermostat 73 before operation of the thermostat 74, and causes the coffee automatically to be discharged from the cooling chamber 18 before a subsequent batch is introduced thereinto by lifting of the gate 22.

It will be seen that the operation is entirely automatic save perhaps for the final removal of the coffee from the cooling chamber 18. Furthermore, once the switch 46 is closed by the initial closing of the hopper 14, the latter may be immediately withdrawn without reopening the circuit to receive the new batch of coffee so as to be ready for the next operation. The switch 46, being mechanically latched into position, will not be opened upon failure of the electric power. Hence, if the current fails for a period of time, the cycle will take up again automatically as soon as the power is restored. The two thermostatic switches operate automatically to control their several circuits. There is provided an absolute control of the roasting operation to prevent burning of the coffee and an insurance that the coffee will be immediately cooled to avoid spontaneous combustion.

What is claimed is:

1. In a mechanism of the kind described, a heating chamber, a heater therefor, a cut-off for the heater having actuating means for effecting operation thereof, a filling means movable from open to closed positions, in the latter of which it discharges material into the heating chamber, said filling means having means adapted to operate the actuating means to actuate the cut-off during movement of the filling means from open to closed positions to permit energization of the heater, and releasable means rendering the cut-off thereafter unaffected by the filling means in its movements to open or closed positions, and automatic means operated when the material is properly heated to release the releasable means, and at the same time to render the cut-off subject to further operation by the filling means.

2. In a mechanism of the kind described, a heating chamber, a heater therefor, a hopper over the chamber and movable from open to closed positions, in the latter of which it discharges its material into the heating chamber, an outlet for the heating chamber, a gate over said outlet, means to open said gate, a cut-out for the heater having actuating means, said actuating means being operated by the hopper in its movement to closed position and releasable means rendering the actuating means thereafter unaffected by the hopper in its further movement, and thermal means responsive to heat produced by the heater simultaneously to open said gate and permit discharge of the material, and to open the releasable means and render the actuating means subject to actuation by the hopper in its further movements.

3. In a mechanism of the kind described, a heating chamber, a heater therefor, a cut-out for the heater having a latch, a movable lever on the cut-out and projecting therefrom, said lever in its movements being adapted to cause said cut-out to be latched closed and thereafter to be unaffected by the lever in its further movements, means to release the latch, a hopper movable from open position to a closed position wherein it discharges material into the heating chamber, said hopper in closing being adapted to strike and and move the movable lever to latch the cut-out closed, and means operable in response to heat produced by the heater to operate the latch releasing means whereby the cut-out opens, the heater is rendered ineffective, and the lever becomes subject to actuation by the hopper in its further movements.

4. In a mechanism of the kind described, a pair of power lines, a first switch, one side of which is connected to one power line, a heater connecting the other side of said switch to the other power line, a magnet and a thermal switch connected in series, said series being in parallel with said heater, and a hopper movable from open to closed position, latch means operable by said hopper to latch said first switch closed in movement of said hopper from open to closed position, and said thermal switch being adapted to close upon occurrence of a predetermined heat condition, whereupon the magnet is energized to release the latch means and permit the first switch to open.

5. In a mechanism of the kind described, a pair of power lines, a latch switch, one side of which is connected to one power line, a heating chamber, a heater for said chamber between the other side of the switch and the other power line, a release magnet and a thermal switch in series, said series being in parallel with said heater, a gate magnet also in series with the thermal switch across said power lines, a discharge passage from said heating chamber, and a gate controlling the passage and operated by the gate magnet, the thermal switch, upon closing in response to a heat condition in the chamber, operating the release magnet to open the latch switch, and operating the gate magnet to open the gate and permit discharge from the chamber.

6. In a mechanism of the kind described, a heating chamber, a heater therein, a cut-off means for controlling energization of the heater, a discharge passage from the heating chamber, a cooling chamber into which said discharge passage leads, a gate across said discharge passage, a passage leading from the cooling chamber, a second gate controlling said cooling chamber passage, said gate being normally urged to closed position, a separate electrical means to open each gate, a thermal switch having a thermal element in the heating chamber for each electrical means, one of said thermal switches being adapted to operate before the other, means mechanically to close the cut-off and maintain it closed, and electrical means in series with the late operating, one of said thermal switches to release said mechanical means, whereby the heater is rendered ineffective and the heating chamber discharge gate is opened, the other thermal switch being closed prior to the late operating switch to open the cooling chamber gate.

7. In a mechanism of the kind described, a pair of power lines, a heating chamber, a heater therefor, a discharge passage therefrom, a gate controlling the passage, a hopper movable from open to closed position to introduce material into the chamber, a latch cut-off switch, one side of which is connected to one power line, the heater being connected between the other power line and the other side of the switch, a release magnet operable to release the latch cut-off switch, and a thermal switch in series, said series being connected in parallel with the heater, a gate magnet connected between one power line and the thermal switch, a second thermal switch and a heat relay being connected in series, the series being across the power lines, and a warning means put across the lines by said heat relay, said second thermal switch being operated at a temperature in the heating chamber below that at which the first operates to cause said warning means to operate, and the first thermal switch being subsequently operated at a higher temperature to operate the release magnet and permit the cut-off switch to open, and to operate the gate magnet to open the discharge gate, the cut-off switch being latched closed by the hopper in its movement from open to closed position.

8. In a mechanism of the kind described, a heating chamber, a heater, a cooling chamber, a passage connecting the two, a gate in the passage, means to open the gate, gate means movable to open and closed positions to introduce a product to be roasted into the heating chamber, means controlling energization of the heater and actuated by the product introducing means in its movements to cause energization of the heater, means maintaining said controlling means in energizing position and independent of the product introducing means, means to release the controlling means to enable its further actuation by the product introducing means, means to open the gate means, and a means to cause said release means and gate opening means to operate simultaneously.

9. In a mechanism of the kind described, a heating chamber, a second chamber, means to conduct material from the heating chamber to the second chamber, a first gate controlling said conducting means, a second gate controlling egress from the second chamber, said gates being normally urged to closed position, thermal means in the heating chamber, means controlled by the thermal means in the heating chamber to open the second gate at a predetermined low temperature, and to open the first gate at a relatively high temperature.

10. In a mechanism of the kind described, a heating chamber, an electrical heater therefor, an electric circuit for energizing same, a circuit for controlling operation of the heater, a passage communicating with the chamber, a gate in said passage, electrical gate operating means for operating said gate, a circuit for said gate operating means, control means including a switch adapted to close the heater circuit to cause energization of the heater, a latch for holding the switch closed, electrical means to release the latch when energized, said electrical means being in the circuit for controlling operation of the heater, thermal means responsive to temperature in the chamber, electrical means operated by the thermal means to close the circuit of the gate operating means and of the releasing electrical means, thereby to operate the gate operating means, and to open the heater circuit when the thermal means is subjected to a predetermined temperature.

LAWRENCE M. PERSONS.